United States Patent
Nishida et al.

(10) Patent No.: US 12,122,453 B2
(45) Date of Patent: Oct. 22, 2024

(54) BODY STRUCTURE OF VEHICLE

(71) Applicant: Mazda Motor Corporation, Hiroshima (JP)

(72) Inventors: Kenji Nishida, Hiroshima (JP); Chikara Kawamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 77 days.

(21) Appl. No.: 17/590,819

(22) Filed: Feb. 2, 2022

(65) Prior Publication Data

US 2022/0274652 A1    Sep. 1, 2022

(30) Foreign Application Priority Data

Feb. 26, 2021    (JP) ................................ 2021-030071

(51) Int. Cl.
  *B62D 25/08*    (2006.01)
  *B62D 29/04*    (2006.01)
  *B62D 29/00*    (2006.01)

(52) U.S. Cl.
  CPC ........... *B62D 25/081* (2013.01); *B62D 29/04* (2013.01); *B62D 25/082* (2013.01); *B62D 25/088* (2013.01); *B62D 29/005* (2013.01)

(58) Field of Classification Search
  CPC .... B62D 25/081; B62D 29/04; B62D 25/088; B62D 29/005; B62D 25/082

(Continued)

(56) References Cited

U.S. PATENT DOCUMENTS 7,837,256 B2 * 11/2010 Takayanagi ............ B62D 29/04
                                                        296/203.02
9,896,131 B2 *  2/2018 Onishi .................... B62D 25/20
                         (Continued)

FOREIGN PATENT DOCUMENTS

JP    2526165      *  2/1997
JP    2526165 Y2  *  2/1997
                (Continued)

OTHER PUBLICATIONS

Extended European search report issued on Aug. 1, 2022, in corresponding European patent Application No. 22154222.8, 8 pages.

(Continued)

*Primary Examiner* — Amy R Weisberg
*Assistant Examiner* — Dana D Ivey
(74) *Attorney, Agent, or Firm* — XSENSUS LLP

(57) ABSTRACT

A body structure of a vehicle includes a coupling member made of fiber reinforced plastic including fibers impregnated with synthetic resin and a pair of rear fixing members that have a bending rigidity higher than the coupling member and fix both end portions in the longitudinal direction of the coupling member to a vehicle body. Boundary portions between the pair of fixing members and the coupling member are formed in both end portions in the longitudinal direction. A distance between the boundary portions on the rear side is different from that between the boundary portions on the front side that extend along neutral axes defined by the lines of intersection between the neutral plane of bending moments of the coupling member and the lateral cross sections of the coupling member when a bending load is input through the pair of rear fixing members to the coupling member.

20 Claims, 13 Drawing Sheets

40: SECOND COUPLING MEMBER
60: REAR FIXING MEMBER

(58) Field of Classification Search
USPC .......................................................... 296/192
See application file for complete search history.

(56) References Cited

U.S. PATENT DOCUMENTS

| | | | |
|---|---|---|---|
| 2016/0152271 A1* | 6/2016 | Kurokawa | B62D 21/02 |
| | | | 296/203.01 |
| 2020/0062315 A1 | 2/2020 | Matsuoka et al. | |

FOREIGN PATENT DOCUMENTS

| | | | |
|---|---|---|---|
| JP | 2009-23529 A | | 2/2009 |
| JP | 2010-173546 A | | 8/2010 |
| JP | 2016-117339 A | | 6/2016 |
| JP | 2019-177830 A | | 10/2019 |
| JP | 2019177831 A | * | 10/2019 |
| JP | 2020-29162 A | | 2/2020 |
| JP | 2020-79014 A | | 5/2020 |

OTHER PUBLICATIONS

Japanese Office Action issued Jun. 14, 2024, in corresponding Japanese Patent Application No. 2021-030071, 4pp.

* cited by examiner

D1 : DISTANCE BETWEEN BOUNDARY PORTIONS ON REAR SIDE
D2 : DISTANCE BETWEEN BOUNDARY PORTIONS ON FRONT SIDE

B1 : BOUNDARY PORTION ON OUTER SIDE
B2 : BOUNDARY PORTION ON INNER SIDE
C4 : CLOSED CROSS SECTION

BODY STRUCTURE OF VEHICLE

CROSS REFERENCE TO RELATED APPLICATIONS

The present application claims priority to Japanese application number 21-030071 filed in the Japanese Patent Office on Feb. 26, 2021. This application is also related to U.S. patent application Ser. No. 17/590,821 filed on: Feb. 2, 2022; entitled FRONT BODY STRUCTURE OF VEHICLE; the entire contents of both of which being incorporated herein by reference.

TECHNICAL FIELD

Embodiments relate to a body structure of a vehicle that includes a coupling member made of fiber reinforced plastic including fibers impregnated with a synthetic resin material and a pair of fixing members that fix the coupling member to a vehicle body.

BACKGROUND ART

A vehicle body bends and deforms when receiving a large load via the damper mechanism of the suspension device of the vehicle since the top portions (referred to as the suspension tower top portions) of suspension tower members provided in the vehicle body support the damper mechanism.

In particular, the body torsional mode occurs because suspension tower top portions are displaced vertically when the vehicle turns, so the operational safety of the vehicle and the riding comfort of the occupants may be degraded.

The front body structure of a vehicle in the patent document 1 has an object of suppressing the vertical displacement of the suspension tower top portions and includes a dash panel that separates the vehicle interior from the engine room, a cowl portion mounted on this dash panel, a pair of left and right front side frames extending forward in the front-rear direction of the vehicle body from the left and right end portions of the dash panel, and a pair of left and right suspension tower members, coupled to the outer portions in the vehicle width direction of the pair of front side frames, that project upward to support the upper portions of the dampers of the suspension device, in which a pair of left and right metal suspension tower bars that couple the cowl portion to the suspension tower members are provided.

In recent years, fiber reinforced plastic such as, for example, carbon fiber reinforced plastic (CFRP) including impregnated carbon fibers has physical properties of high specific strength (strength/specific gravity) and high specific rigidity (rigidity/specific gravity), which are so-called lightness and strength●rigidity, so carbon fiber reinforced plastic is widely used as structural materials for aircraft, vehicles, and the like. Since mechanical properties such as strength are provided by carbon fibers and the stress transfer function and the fiber protection function between carbon fibers are provided by the base material resin (matrix), this carbon fiber reinforced plastic forms an anisotropic material whose physical properties differ greatly between the fiber direction in which the fibers extend and the non-fiber direction (so-called load direction).

A technology for using fiber reinforced plastic has been proposed to achieve both body rigidity and weight reduction.

The suspension tower bars in patent document 2 couple the suspension tower top portions of a pair of left and right suspension tower members to each other or the pair of suspension tower top portions and the dash member (for example, the cowl portion) to each other, the body portions of the suspension tower bars are formed by fiber reinforced plastic plate materials, and the fiber reinforced plastic plate materials are formed so that FRP sheets with fiber orientation angles of 0°/90° and FRP sheets with fiber orientation angles of 45°/−45° are stacked alternately.

PRIOR ART DOCUMENTS

Patent Documents

[Patent document 1] JP-A-2020-029162
[Patent document 2] JP-A-2010-173546

SUMMARY

Problems to be Solved

Since the suspension tower members fall inward and the cowl portion is displaced vertically like a bow during a travel on a rough road, torsional displacement is caused between the suspension tower top portions and the dash member including the cowl portion. Since the membrane vibration mode occurs in the panel members such as the floor panel due to the torsional displacement between the suspension tower top portions and the dash member, the vibration damping performance of a vehicle during a travel may degrade. Since the suspension tower bars of the techniques in patent documents 1 and 2 do not have a vibration damping function, even if the body torsion mode can be suppressed by the bending rigidity of the suspension tower bar, the membrane vibration mode cannot be suppressed.

By changing the material, a strut tower bar having a function capable of damping vibrations by torsional displacement may be formed and the strut tower bar may be attached to the cowl portion via a fixing member.

However, when the strut tower bar is disposed along the front surface of the cowl portion that is displaced vertically, only bending deformation instead of torsional displacement is caused structurally in the strut tower bar in the membrane vibration mode of the vehicle body, so the vibration damping function thereof cannot be fully exerted.

That is, it is not easy to obtain a coupling member capable of exerting a vibration damping function even in a bending input portion like the cowl portion.

One or more embodiments is directed to providing a body structure of a vehicle or the like capable of exerting a vibration damping function regardless of an input portion.

Means for Solving the Problems

According to a first aspect, there is provided a body structure of a vehicle including: a coupling member made of fiber reinforced plastic including fibers impregnated with synthetic resin, the fibers being oriented so that fibers extending in a longitudinal direction of the coupling member are more than fibers extending in directions other than the longitudinal direction; and a pair of fixing members that have a bending rigidity higher than the coupling member, the pair of fixing members fixing both end portions in the longitudinal direction of the coupling member to a vehicle body, in which boundary portions between the pair of fixing members and the coupling member are formed in both end portions in the longitudinal direction of the coupling member, and a distance between the boundary portions on one end side is different from a distance between the boundary portions on the other end side in the boundary portions that extend along neutral axes defined by lines of intersection between a neutral plane of bending moments of the coupling member and lateral cross sections of the coupling member when a bending load is input through the pair of fixing members to the coupling member.

According to this structure, since the boundary portions between the pair of fixing members and the coupling member are formed in both end portions in the longitudinal direction of the coupling member, the coupling member can be supported by the vehicle body with both sides in the longitudinal direction held. Since the distance between the boundary portions on one end side is different from the distance between the boundary portions on the other end side in the boundary portions that extend along neutral axes defined by lines of intersection between a neutral plane of bending moments of the coupling member and cross sections of the coupling member when the bending load is input through the pair of fixing members to the coupling member, it is possible to make the bending moments acting on one end side of the boundary portions different from the bending moments acting on the other end side of the boundary portions even in a bending input portion and cause torsional deformation in the coupling member by converting the vertical displacement acting on the coupling member to the torsional displacement.

According to a second aspect, in the body structure of a vehicle according to the first aspect, one end portions of the boundary portions are disposed in proximity to the vehicle body and the other end portions of the boundary portions are disposed away from the vehicle body, and the distance between the boundary portions on one end side is smaller than the distance between the boundary portions on the other end side.

According to this structure, even when the coupling member is disposed on the side of the vehicle body, the bending moments acting on one end portions of the boundary portions between the fixing members and the coupling member can be different from the bending moments acting on the other end portions. In addition, since the distance between the boundary portions on one end side is smaller than the distance between the boundary portions on the other end side, the torsional displacement of the coupling member can be increased.

According to a third aspect, in the body structure of a vehicle according to the first or second aspect, the boundary portions extending along the neutral axes are inclined.

According to this structure, since the bending moments gradually change along the boundary portions, the local concentration of the load on the coupling member can be avoided. In addition, the portions near the boundary portions can contribute to the damping of vibrations.

According to a fourth aspect, in the body structure of a vehicle according to the third aspect, each of the fixing members includes a fixing outer member and a fixing inner member that forms a closed cross section extending in the longitudinal direction in cooperation with the fixing outer member, and a boundary part between the fixing outer member and the fixing inner member is inclined.

According to this structure, the vertical displacement acting on the coupling member can be reliably converted to the torsional displacement with a simple structure.

According to a fifth aspect, in the body structure of a vehicle according to the first or second aspect, the boundary portions that extend along the neutral axes are stepped.

According to this structure, the bending moments acting on one end side of the boundary portions between the fixing members and the coupling member can be different from the bending moments acting on the other end side of the boundary portions.

According to a sixth aspect, in the body structure of a vehicle according to any one of the first to fifth aspects, the coupling member has an outer member having a substantially U-shaped cross section and an inner member having a substantially U-shaped cross section, the inner member forming a closed cross section extending in the longitudinal direction by fitting to the outer member.

According to this structure, the closed cross section can promote an increase in the bending rigidity of the coupling member and the open cross section formed by the difference in the dimensions in the longitudinal direction can promote an increase in the vibration damping performance of the coupling member.

According to a seventh aspect, in the body structure of a vehicle according to the sixth aspect, portions of the fixing members close to the coupling member are inserted into the closed cross section of the coupling member.

According to this structure, the torsional displacement of the coupling member can be induced while the number of components of the boundary portions between the fixing members and the coupling member is reduced.

According to an eighth aspect, the body structure of a vehicle according to any one of the first to seventh aspects further includes: a dash panel which extends in the vehicle width direction, separates an engine room from a vehicle interior; and a cowl portion provided on the dash panel, in which the coupling member is coupled to one end portion and the other end portion in the vehicle width direction of the cowl portion.

According to this structure, the vibration damping function of the coupling member can be achieved and the riding comfort of the occupants can be improved by converting the vertical displacement of the cowl portion in the membrane vibration mode to the torsional displacement of the coupling member.

The body structure of a vehicle according to one or more embodiments can achieve the vibration damping function regardless of the input portion by making the bending moments in the boundary portions between the coupling member and the fixing members different from each other along the neutral axes.

DETAILED DESCRIPTION

Figure 1:
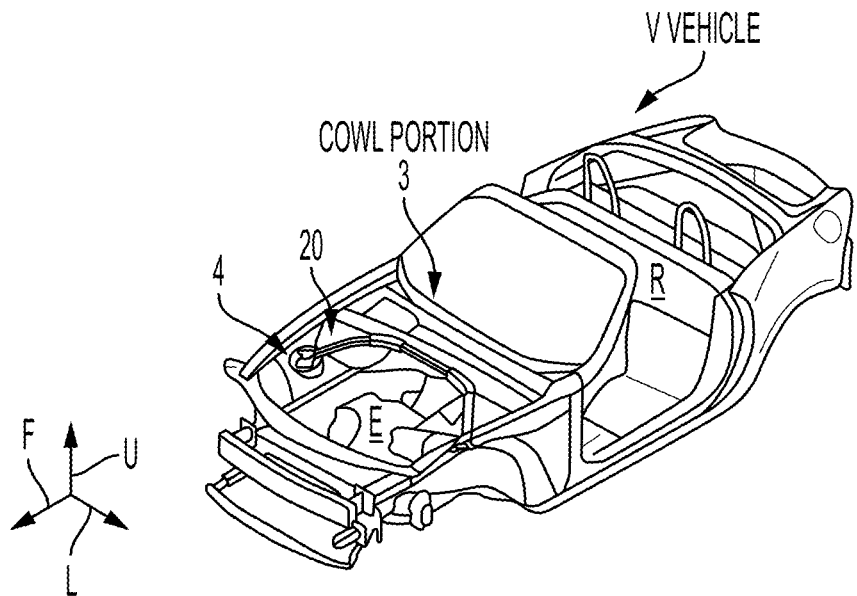
FIG. 1 is a diagram illustrating a vehicle according to a first example as seen from diagonally above.
Figure 2:
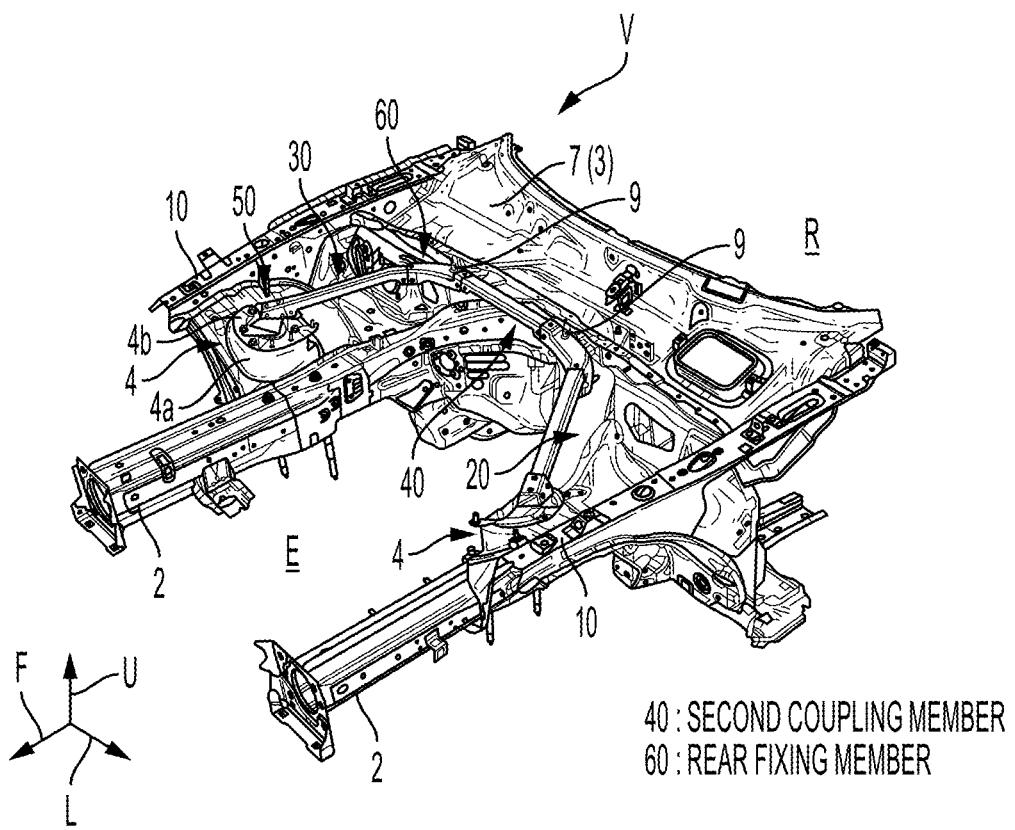
FIG. 2 is a perspective view of a front body structure.
Figure 3:
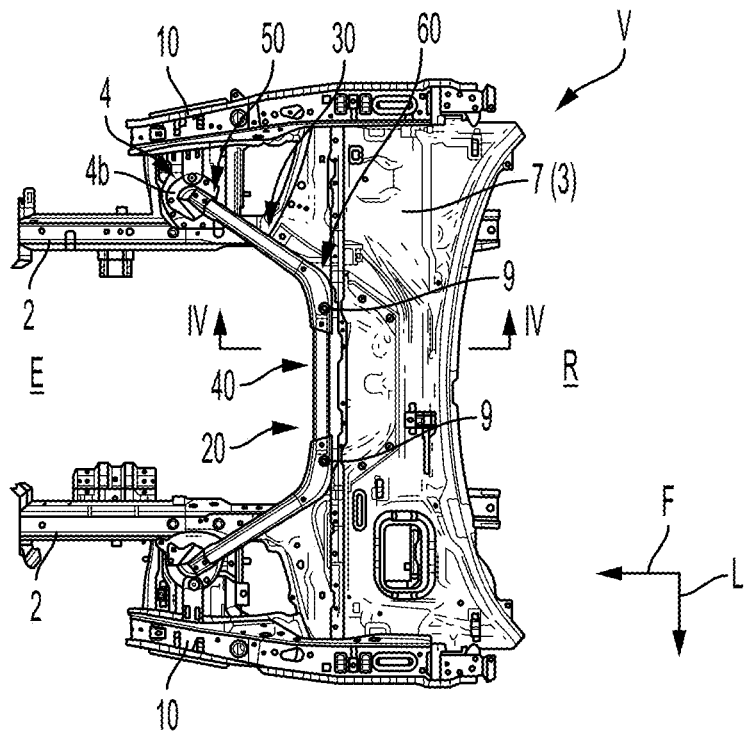
FIG. 3 is a plan view of the front body structure.

An embodiment will be described in detail with reference to the drawings.

The following description applies embodiments to a lower body structure of a vehicle, but is not limited thereto, the application thereof, or the use thereof.

Example 1

Example 1 will be described with reference to FIGS. 1 to 22B.

First, the overall structure of a vehicle V will be described. In the following descriptions, it is assumed that the direction of arrow F is the front side, the direction of arrow L is the left side, and the direction of arrow U is the upper side.

As illustrated in FIGS. 1 to 4, the vehicle V is configured by a monocoque body and includes a floor panel that forms the bottom surface of a vehicle interior R, a dash panel 1, formed so as to rise up from the front end portion of this floor panel, that separates an engine room E from the vehicle interior R in the vehicle width direction, and a pair of left and right front side frames 2 extending forward from the front surface of this dash panel 1, and a pair of left and right rear side frames that extend backward from the rear end portion of the floor panel.

This vehicle V further includes a cowl portion 3, formed on the top of the dash panel 1, that extends in the vehicle width direction and a pair of left and right strut towers 4 (suspension tower members) that bulge toward the inside of the engine room E. This vehicle V may be equipped with an independent strut suspension.

The cowl portion 3 is formed in a tub shape by press-forming a steel plate. This cowl portion 3 mainly includes a cowl panel 5, a cowl member 6, projecting forward from the front end portion of the cowl panel 5, that forms a tub shaped structure in cooperation with the cowl panel 5, and a cowl grill 7 that partially covers the upper portions of the cowl panel 5 and the cowl member 6.

Figure 4:
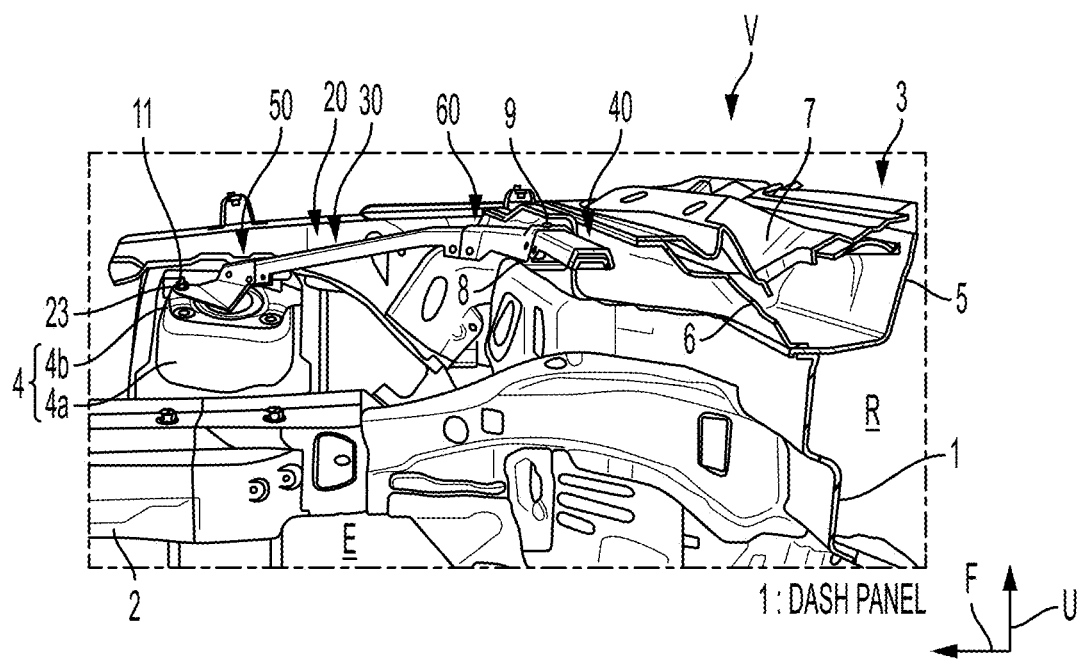
FIG. 4 is a sectional view taken along line IV-IV in FIG. 3.

As illustrated in FIG. 4, a pair of left and right mounting brackets 8 projecting forward are disposed in the left and right end portions of the front wall of the cowl member 6. The pairs of mounting brackets 8 are formed in a substantially partial ellipse in plan view and the stud bolts 9 extending vertically upward from the upper surfaces thereof are provided.

As illustrated in FIGS. 1 to 4, the pair of the strut towers 4 project upward. Specifically, the strut towers 4 bulge into the engine room E from the wheel aprons hung between the apron reinforcements 10 and the front side frames 2 that extend forward and backward. Since the structure of the vehicle V is substantially symmetrical, the right side members and the right side structure will be mainly described below.

Each of the strut towers 4 includes a hollow cylindrical portion 4a having an axial center that shifts upward toward the rear side, and an annular top portion 4b that closes the upper end portion of this cylindrical portion 4a. A plurality of stud bolts 11 extending upward are erected on the top portion 4b. This strut tower 4 partially accommodates the upper portion of the damper mechanism (such as the damper and the spring) of the front suspension device). The spring seat coupled to the upper end portion of the damper mechanism is fastened and fixed to the top portion 4b by a plurality of fastening members via a mount rubber.

Next, a strut tower bar 20 will be described.

As illustrated in FIGS. 1 to 4, this vehicle V is provided with the strut tower bar 20 that structurally couples the pair of strut towers 4 to the cowl member 6 via a plurality of fastening members. This strut tower bar 20 is substantially U-shaped in plan view and can suppress the behavior modes (the vehicle body torsional mode and the membrane vibration mode) of the vehicle body that affect the riding comfort.

Here, the behavior modes of the vehicle body will be described. The vehicle body torsional mode is a behavior mode used when the vehicle is turning.

Figure 5A:
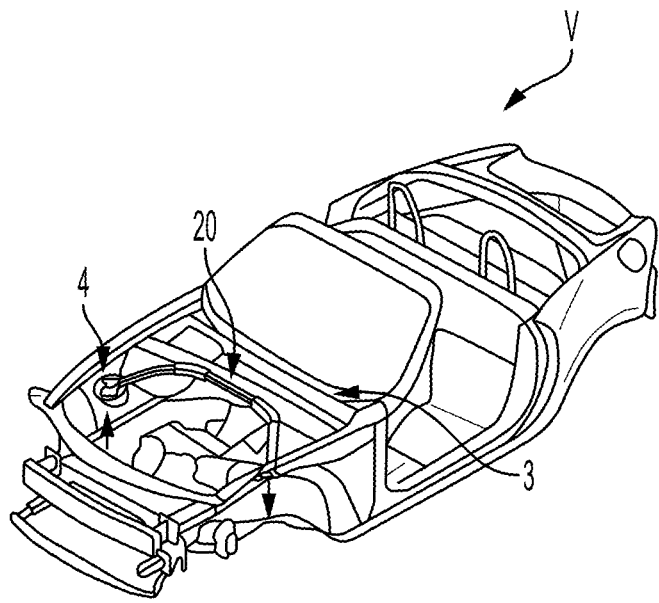
FIG. 5 illustrates explanatory diagrams of a body torsional mode and a membrane vibration mode of a vehicle body.
Figure 5B:
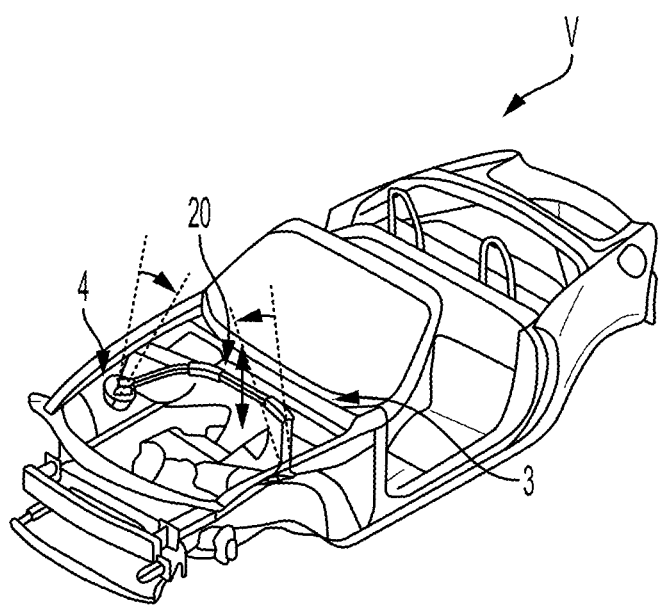

As illustrated by the arrow in (a) FIG. 5, the top portions 4b of the strut towers 4 are displaced in the vertical direction due to the expansion and contraction of the damper mechanism when the vehicle is turning. The vehicle body torsional mode about the center axis of the vehicle body occurs due to the vertical displacement of the top portions 4b, causing degradation of steering stability.

The membrane vibration mode is a behavior mode used when the vehicle travels on a rough road surface.

As illustrated by the arrow in (b) FIG. 5, when the vehicle travels on a rough road surface, the strut towers 4 fall inward in the vehicle width direction while the cowl portion 3 is displaced in the vertical direction like a bow. The torsional displacement between the top portions 4b and the cowl portion 3 generates the membrane vibration mode on the panel member, especially on the floor panel having a large area, and causes degradation of riding comfort.

The strut tower bar 20 will be described again.

Figure 6:
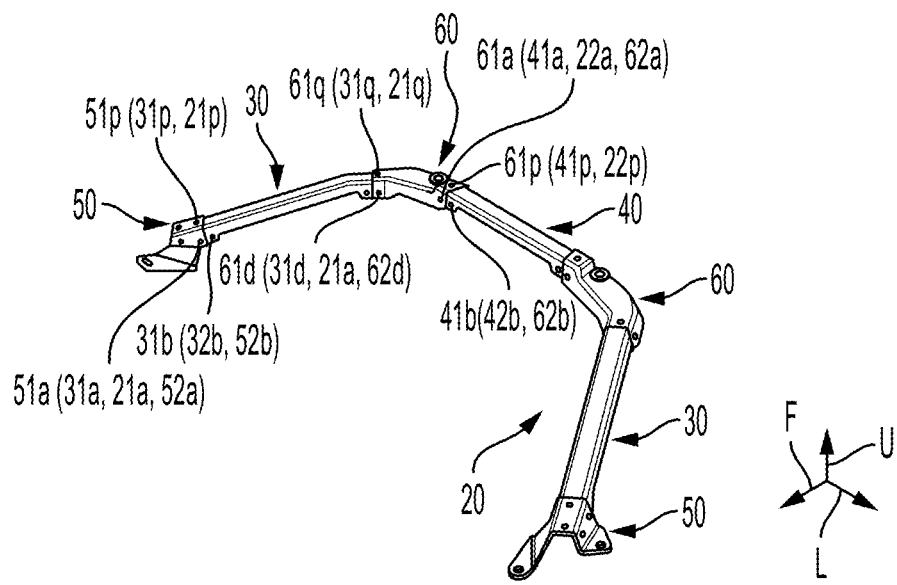
FIG. 6 is a perspective view of a strut tower bar.
Figure 7:
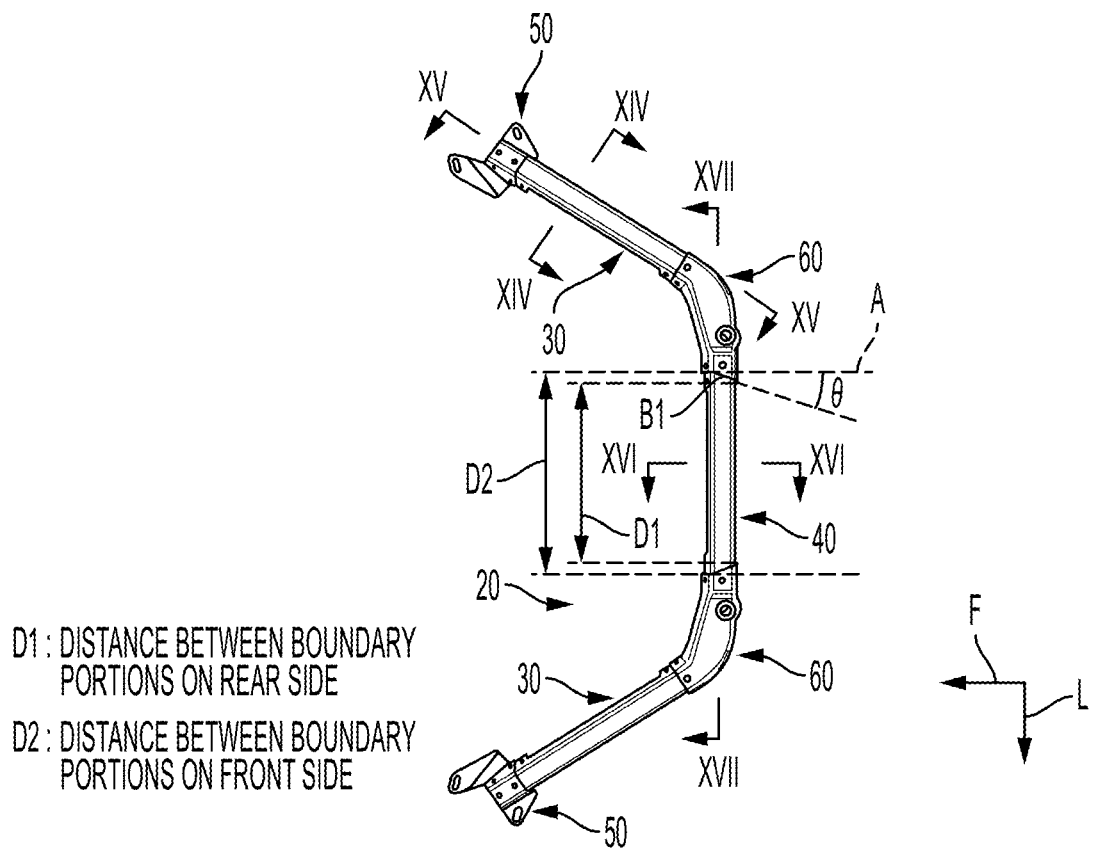
FIG. 7 is a plan view of the strut tower bar.
Figure 8:
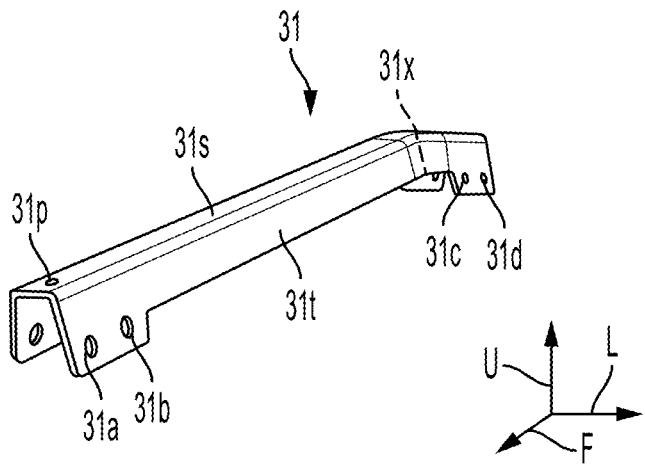
FIG. 8 is a perspective view of a first coupling outer member.
Figure 9:
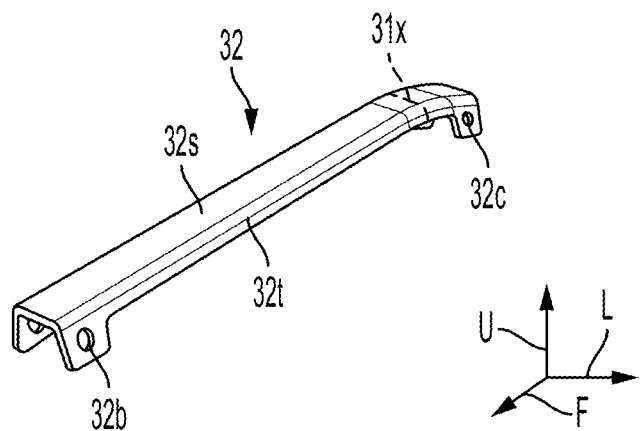
FIG. 9 is a perspective view of a first coupling inner member.

As illustrated in FIGS. 6 and 7, the strut tower bar 20 mainly includes a pair of left and right first coupling members 30 that shift to the inside in the vehicle width direction toward the rear side, a second coupling member 40 (coupling member), extending in the vehicle width direction, that couples the rear end portions of the pair of first coupling members 30, a pair of left and right front fixing members 50 that fix the front end portions of the pair of first coupling members 30 to the stud bolts 11 erected from the top portions 4b of the pair of strut towers 4 via fastening members 23, and a pair of left and right rear fixing members 60 (fixing members), connecting the rear end portions of the pair of first coupling members 30 and the left and right end portions of the second coupling members 40, that fasten and fix the connection portions thereof to the mounting brackets 8 via the stud bolts 9 and the tightening members.

The main material of the first coupling members 30 and the second coupling member 40 is carbon fiber reinforced plastic (CFRP) in which a reinforcing material (for example, carbon fiber) is impregnated with a synthetic resin (for example, thermosetting epoxy synthetic resin).

Carbon fiber includes a fiber bundle (tow) in which a predetermined number of single fibers continuously extending uniformly from one end to the other end in the longitudinal direction of the first coupling members 30 and the second coupling member 40.

The front fixing members 50 and the rear fixing members 60 are made of an aluminum alloy material.

Accordingly, the front fixing members 50 and the rear fixing members 60 have bending rigidity and torsional rigidity that are larger than in the first coupling members 30 and the second coupling member 40.

The plate materials of the first coupling members 30 and the second coupling member 40 include three types of layered portions.

Figure 18:
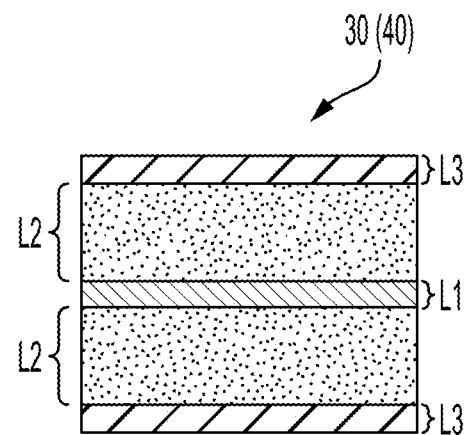
FIG. 18 is an enlarged sectional view of the first coupling outer member.

As illustrated in FIG. 18, the first coupling members 30 and the second coupling member 40 have a middle layer portion L1 disposed in the middle portion in the thickness direction, main body layer portions L2 that sandwich the middle layer portion L1, and surface layer portions L3 that covers the surfaces of the main body layer portions L2. The surface layer portions L3 are provided to ensure corrosion resistance (electrolytic corrosion resistance).

The middle layer portion L1 is a fiber reinforced plastic layer having an orientation of 90° in which the carbon fibers extend orthogonally to the longitudinal direction. The main body layer portion L2 is a fiber reinforced plastic layer having an orientation of 0° in which the carbon fibers described above extend in the longitudinal direction. The surface layer portion L3 is a glass fiber reinforced plastic (GFRP) layer in which woven glass fibers are impregnated with a synthetic resin. The volume ratio (L1 to L2 to L3) of these layers are set to, for example, 7 to 80 to 13. In other words, the volume ratio of L1 to L3 may be within a same order of magnitude and between L1 to L2 may be an order of magnitude.

Next, the first coupling member 30 will be described.

As illustrated in FIGS. 8, 9, 14, and 15, the first coupling member 30 includes a first coupling outer member 31 that has a substantially U-shaped cross section orthogonal to the longitudinal direction and a first coupling inner member 32, forming a closed cross section C1 extending in the longitudinal direction in cooperation with the first coupling outer member 31 in an intermediate portion in the longitudinal direction, that has a substantially U-shaped cross section. The first coupling outer member 31 has open cross sections in both end portions in the longitudinal direction. The closed cross section C1 is formed asymmetrically with respect to a middle line C of the cross section orthogonal to the longitudinal direction in the cross section.

Accordingly, when a bending load is input to the first coupling member 30, the bending load is converted to torsional displacement of the first coupling member 30. The torsional displacement of the first coupling member 30 is converted to strain energy and kinetic energy and this strain energy is temporarily stored in the synthetic resin material of the first coupling member 30 as shear strain. After that, the stored strain energy (shear strain) is converted to kinetic energy again and part thereof is dissipated as thermal energy.

The first coupling outer member 31 includes an upper wall portion 31s and a pair of side wall portions 31t, extending downward from both end portions parallel to the longitudinal direction of the upper wall portion 31s.

Of each of the side wall portions 31t, the front portion and the rear portion in the longitudinal direction are set to have larger widths (vertical dimensions) than the intermediate portion. Openings 31a and 31b are formed in the front portions of the pair of side wall portions 31t in the order from the front and openings 31c and 31d are formed in the rear portions of the pair of side wall portions 31t in the order from the front. An opening 31p is formed at the position corresponding to the opening 31a in the front portion of the upper wall portion 31s of the upper wall portion 31s and an opening 31q is formed at the position corresponding to the opening 31d in the rear portion of the upper wall portion 31s. A bent portion 31x that projects upward and extends in the left-right direction is formed in an intermediate portion of the rear side of the upper wall portion 31s.

The first coupling inner member 32 is shorter in the longitudinal dimension than the first outer coupling member 31. The first coupling inner member 32 includes an upper wall portion 32s and a pair of side wall portions 32t, extending downward from both end portions that are parallel to the longitudinal direction of the upper wall portion 32s.

Of each of the side wall portions 32t, the front portion and the rear portion in the longitudinal direction are set to have larger widths than the intermediate portion. Openings 32b are formed at positions corresponding to the openings 31b in the front portions of the pair of side wall portions 32t and openings 32c are formed at positions corresponding to the openings 31c in the rear portions of the pair of side wall portions 32t. A bent portion 32x that projects upward and extends in the left-right direction is formed at a position corresponding to the bent portion 31x in an intermediate portion of the rear side of the upper wall portion 32s. Adjusting members 21 having a substantially U-shaped cross section are disposed in both end portions in the longitudinal direction of the first coupling inner member 32.

Next, the second coupling member 40 will be described.

Figure 16:
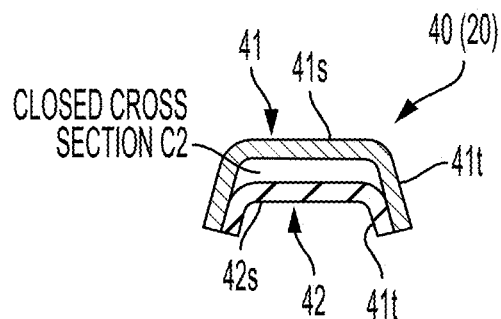
FIG. 16 is a sectional view taken along line XVI-XVI in FIG. 7.
Figure 17:
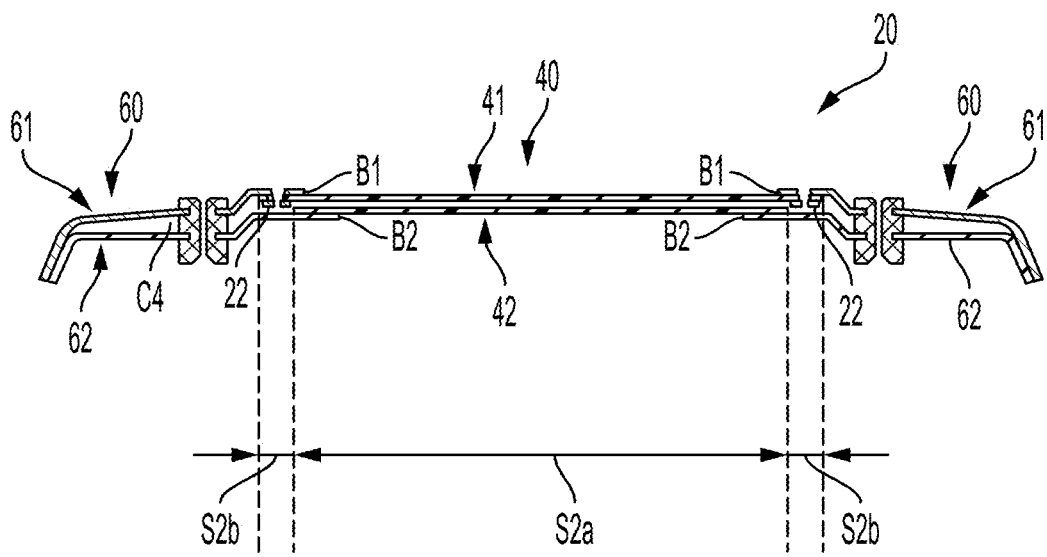
FIG. 17 is a sectional view taken along line XVII-XVII in FIG. 7.

As illustrated in FIGS. 16 and 17, the second coupling member 40 is made of the same material as the first coupling member 30 and includes a second coupling outer member 41 having a substantially U-shaped cross section orthogonal to the longitudinal direction and a second coupling inner member 42, having a substantially U-shaped cross section, that forms a closed cross section C2 extending in the longitudinal direction in an intermediate portion in the longitudinal direction in cooperation with the second coupling outer member 41. The second coupling outer member 41 has open cross sections in both end portions in the longitudinal direction. The closed cross section C2 is symmetric with respect to the middle line of the cross section orthogonal to the longitudinal direction in the cross section and has a substantially trapezoidal shape. This increases the bending rigidity of the second coupling member 40.

The second coupling outer member 41 includes an upper wall portion 41s and a pair of side wall portions 41t extending downward from both end portions parallel to the longitudinal direction of the upper wall portion 41s.

Of each of the side wall portions 41t, the left portion and the right portion in the longitudinal direction are set to have larger widths than an intermediate portion. An opening 41a on the outer side in the vehicle width direction and an opening 41b on the inner side in the vehicle width direction are formed in the right portion and the left portion of the pair of side wall portions 41t, respectively, and openings 41p are formed at positions corresponding to the opening 41a in the right end portion and the left end portion of the upper wall portion 41s (see FIG. 6).

As illustrated in FIG. 17, the second coupling inner member 42 may be shorter in the longitudinal direction than the second coupling outer member 41. As illustrated in FIG. 16, the second coupling inner member 42 may have an upper wall portion 42s and a pair of side wall portions 42t extending downward from both end portions parallel to the longitudinal direction of the upper wall portion 42s. Of the side wall portions, the front portion and the rear portion in the longitudinal direction may have larger widths than an intermediate portion. In the front portions of the pair of the side wall portions, openings 42b may correspond to the opening 41b (see FIG. 6). The adjusting members 22 having a substantially U-shaped cross section is disposed in both end portions in the longitudinal direction of the second coupling inner member 42.

Next, the front fixing member 50 will be described.

Figure 10:
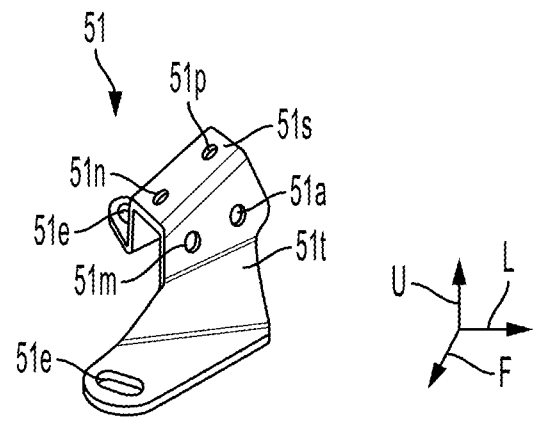
FIG. 10 is a perspective view of a front fixing outer member.
Figure 11:
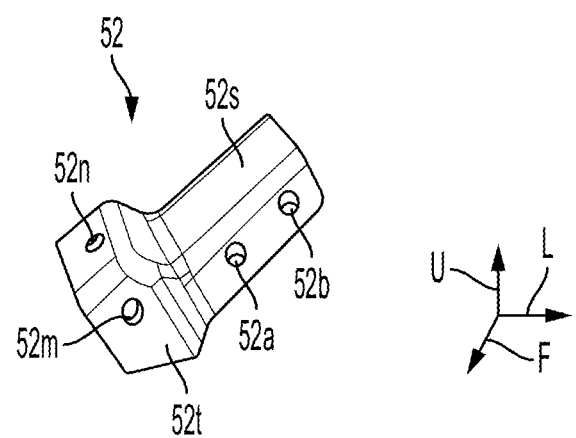
FIG. 11 is a perspective view of a front fixing inner member.
Figure 15:
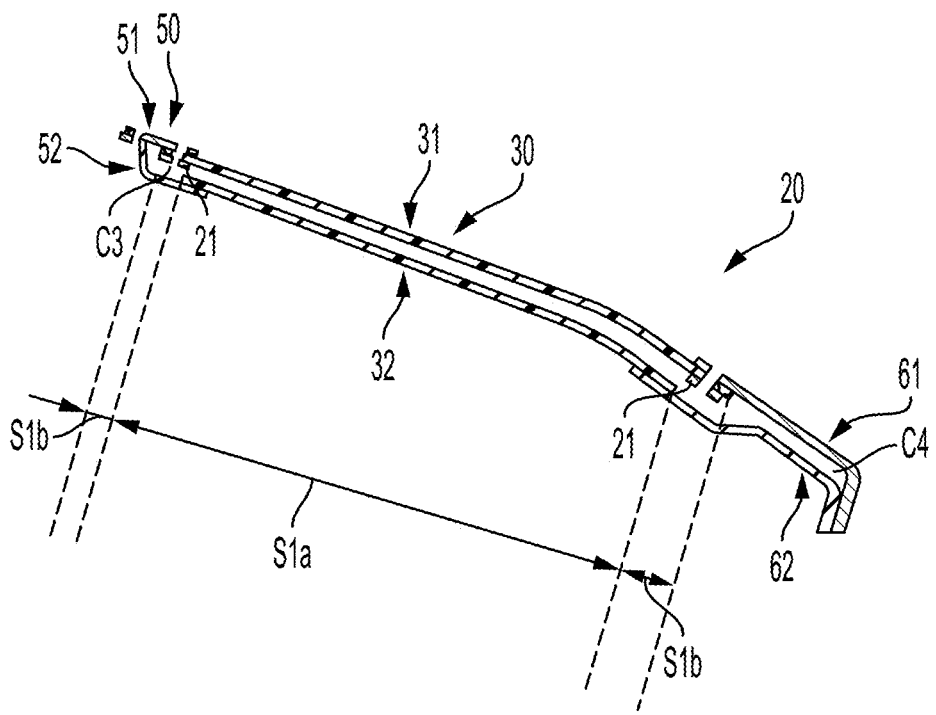
FIG. 15 is a sectional view taken along the line XV-XV in FIG. 7.

As illustrated in FIGS. 10, 11, and 15, the front fixing member 50 may include a front fixing outer member 51 that is substantially hat-shaped in a cross section orthogonal to the longitudinal direction and a front fixing inner member 52, having substantially U-shaped cross section, that forms a closed cross section C3 extending in the longitudinal direction in the front portion in the longitudinal direction in cooperation with the front fixing outer member 51. The front fixing outer member 51 is shorter in the longitudinal direction than the front fixing inner member 52. The closed cross section C3 of the front fixing member 50 may extend in the longitudinal direction and correspond to an open cross section area S1b of the first coupling member 30. An open cross section of the front fixing member 50 may continue to the rear side of the closed cross section C3 and correspond to a closed cross section area S1a of the first coupling member 30.

The front fixing outer member 51 includes an upper wall portion 51s and a pair of side wall portions 51t extending downward from both end portions parallel to the axis of the upper wall portion 51s and then extending away from the axis.

In the vertical portions of the side wall portions 51t corresponding to wall portions that form the closed cross section, openings 51m and openings 51a may be formed in the order from the front. In the horizontal portions that correspond to the flange portions, openings 51e are formed. In the upper wall portion 51s, an opening 51n and an opening 51p are formed at positions corresponding to the openings 51m and the openings 51a, respectively. It should be noted that stud bolts 11 are inserted into the openings 51e.

The front fixing inner member 52 has an upper wall portion 52s and a pair of side wall portions 52t extending downward from both end portions of the upper wall portion 52s that are parallel to the longitudinal direction. Each of the side wall portions 52t may have an opening 52m that corresponds to the opening 51m, an opening 52a that corresponds to the opening 51a, and an opening 52b that corresponds to the opening 31b (opening 32b) behind the opening 52a. An opening 52n is formed at the position corresponding to the opening 51n in front of the upper wall portion 52s.

Next, the rear fixing member 60 will be described.

As illustrated in FIGS. 12, 13, 15, and 17, the rear fixing member 60 may include a rear fixing outer member 61 that has a substantially U-shaped cross section orthogonal to the longitudinal direction and a rear fixing inner member 62, having a substantially U-shaped cross section, that forms a closed cross section C4 extending in the longitudinal direction in cooperation with the rear fixing outer member 61. The rear fixing outer member 61 may be shorter in the longitudinal direction than the rear fixing inner member 62. The outer portion in the vehicle width direction of the closed cross section C4 of the rear fixing member 60 may correspond to the open cross section area S1b of the first coupling member 30 and the inner portion in the vehicle width direction of the closed cross section C4 of the rear fixing member 60 may correspond to the open cross section area S2b of the second coupling member 40.

In addition, the open cross section outside in the vehicle width direction of the rear fixing member may correspond to the closed cross section area S1a of the first coupling member 30 and the open cross section inside in the vehicle width direction of the rear fixing member 60 may correspond to the closed cross section region S2a of the second coupling member 40.

The rear fixing outer member 61 has an upper wall portion 61s and a pair of side wall portions 61t extending downward from both end portions parallel to the longitudinal direction of the upper wall portion 61s.

Each of the side wall portions 61t may have an opening 61d corresponding to the opening 31d outside in the vehicle width direction and an opening 61a corresponding to the opening 41a inside in the vehicle width direction.

The upper wall portion 61s may have an opening 61q corresponding to the opening 31q, an opening 61p corresponding to the opening 41p, and a stud hole 61r disposed in an intermediate portion.

The rear fixing inner member 62 may have an upper wall portion 62s and a pair of side wall portions 62t extending downward from both end portions parallel to the longitudinal direction of the upper wall portion 62s. In each of the side wall portions 62t, an opening 62c corresponding to the opening 31c, an opening 62d corresponding to the opening 31d, an opening 62a corresponding to the opening 41a, and an opening 62b corresponding to the opening 41b may be formed in the order from the outside in the vehicle width direction. A stud hole 62r corresponding to the stud hole 61r is provided in the upper wall portion 62s. It should be noted that the stud bolts 9 are inserted into the openings 61r and 62r.

Figure 12:
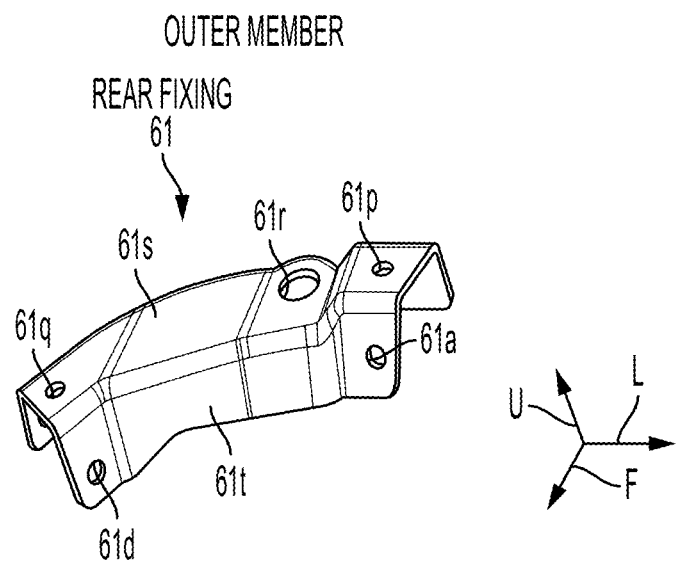
FIG. 12 is a perspective view of a rear fixing outer member.
Figure 13:
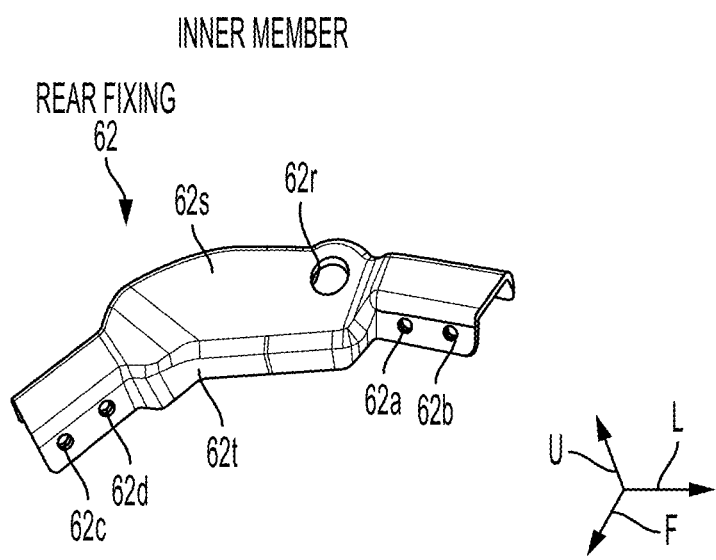
FIG. 13 is a perspective view of a rear fixing inner member.
Figure 14:
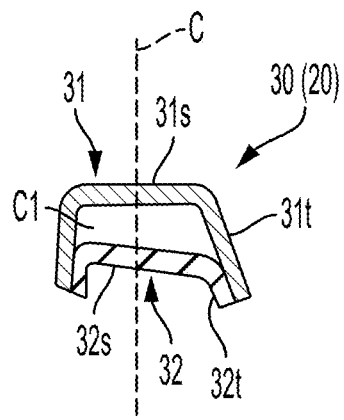
FIG. 14 is a sectional view taken along line XIV-XIV in FIG. 7.

As illustrated in FIGS. 12 and 13, the end portion inside in the vehicle width direction of the rear fixing outer member 61 and the end portion inside in the vehicle width direction of the rear fixing inner member 62 may be substantially parallel to each other in plan view.

As illustrated in FIG. 17, boundary portions B1 between the end portions inside in the vehicle width direction of the rear fixing outer member 61 and the second coupling outer member 41 is disposed outside in the vehicle width direction of boundary portions B2 between the end portions inside in the vehicle width direction of the rear fixing inner member 62 and the second coupling inner member 42 in plan view.

As illustrated in FIG. 7, the pair of left and right boundary portions B1 (B2) are inclined.

When the cowl portion 3 is displaced in the vertical direction like a bow with the strut tower bar 20 attached to the vehicle body, the boundary portions B1 (B2) intersect neutral axes A at a predetermined angle θ. The distance between the pair of boundary portions B1 (B2) is formed so that a distance D1 between the boundary portions on the rear side closest to the cowl portion 3 is the shortest and a distance D2 between the boundary portions on the front side farthest from the cowl portion 3 is the longest. It should be noted that the neutral axis A is a line in which the neutral plane of the second coupling member 40 intersects the cross section orthogonal to the longitudinal direction.

Next, the assembly process of the strut tower bar 20 will be described.

Figure 19:
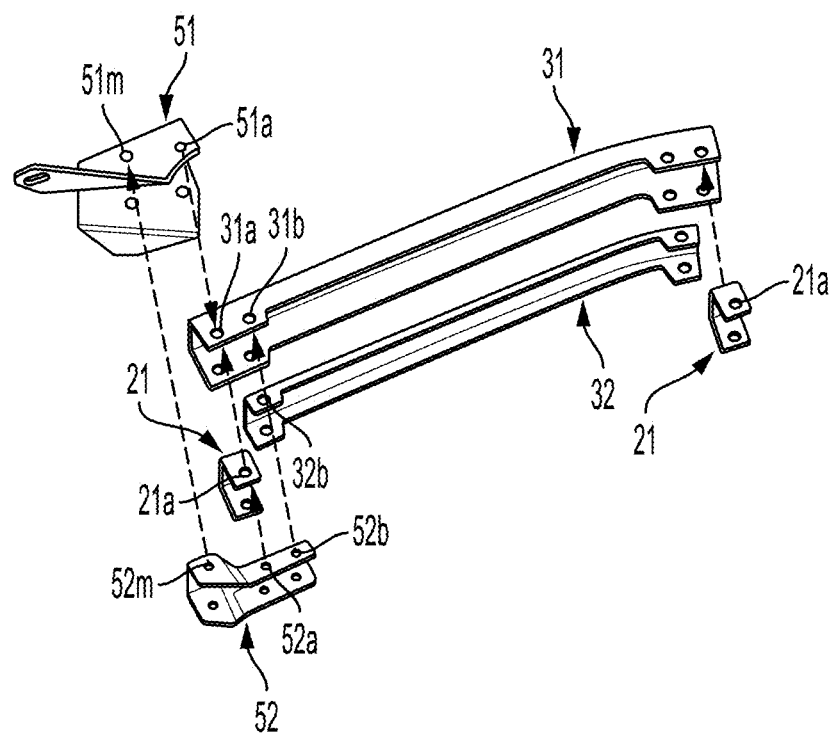
FIG. 19 is an exploded perspective view of the first coupling member and the front fixing member.

As illustrated in FIG. 19, in the first coupling member 30, after the openings 31b and 31c are aligned with the opening 32b and 32c, respectively, and then the first coupling inner member 32 is fitted and fixed to the first coupling outer member 31 with an adhesive to form the closed cross section C1. A pair of adjusting members 21 are disposed on a first end side and a second end side in the longitudinal direction of the first coupling inner member 32, respectively. An opening 21p is formed in the upper wall portion of each of the adjusting members 21 and openings 21a are formed in the side wall portions of each of the adjusting members 21.

The pair of adjusting members 21 may be positioned so that the openings 21a correspond to the openings 31a and 31d of the first coupling outer member 31 and the openings 21p correspond to the openings 31p and 31q.

The second coupling outer member 41 may be fitted and fixed to the second coupling inner member 42 to form the closed cross section C2 in substantially the same procedure.

The pair of the adjusting members 22 may be disposed on a first end side and a second end side in the longitudinal direction of the second coupling inner member 42, respectively. The opening 22p is formed in the upper wall portion of each of the adjusting members 22 and openings 22a may be formed in the side wall portions of each of the adjusting members 22. The pair of the adjusting members 22 may be positioned so that the openings 22a correspond to the openings 41a of the second coupling outer member 41 and the openings 22p correspond to the openings 41p.

The front fixing outer member 51 covers the end portion of the first coupling outer member 31 from above and the front fixing inner member 52 covers the adjusting members 21 and the first coupling inner member 32 from below, so that the front fixing outer member 51 and the front fixing inner member 52 form the closed cross section C3 and the open cross section. Since the front fixing member 50 surrounds the first coupling member 30 from the outer circumference, the front fixing member 50 has a larger cross-sectional area than the first coupling member 30 and has a larger moment of inertia of area and a larger polar moment of inertia of area than the first coupling member 30.

The opening 51n coincides with the opening 52n and the opening 51m coincides with the opening 52m. Since the openings 51a and 51p of the front fixing outer member 51 and the openings 52a and 52b of the front fixing inner member 52 are fixed to the first coupling member 30 via screws (or the like, the openings are equivalent to fixing portions. The openings 51a, 51p, and 52a may correspond to the open cross section region Sib of the first coupling member 30, and the opening 52b may correspond to the closed cross section region S1a of the first coupling member 30.

The rear fixing outer member 61 covers the end portion of the first coupling outer member 31 from above and the rear fixing inner member 62 covers the adjusting member 25 and the first coupling inner member 32 from below, so that the rear fixing outer member 61 and the rear fixing inner member 62 form a closed cross section C4 and the open cross section. Since the rear fixing member 60 surrounds the first coupling member 30 from the outer circumference, the rear fixing member 60 has a larger cross-sectional area than the first coupling member 30 and has a larger moment of inertia of area and a larger polar moment of inertia of area than the first coupling member 30. Since the openings 61d and 61q of the rear fixing outer member 61 and the openings 62c and 62d of the rear fixing inner member 62 are fixed to the first coupling member 30 via screws or the like, the openings are equivalent to fixing portions.

In addition, the rear fixing outer member 61 covers the end portion of the second coupling outer member 41 from above and the rear fixing inner member 62 covers the adjusting member 27 and the second coupling inner member 42 from below, so that the rear fixing outer member 61 and the rear fixing inner member 62 form the closed cross section C4 and the open cross section. Since the rear fixing member 60 surrounds the second coupling member 40 from the outer circumference, the rear fixing member 60 has a larger cross-sectional area than the second coupling member 40 and has a larger moment of inertia of area and a larger polar moment of inertia of area than the second coupling member 40.

Since the openings 61a and 61p of the rear fixing outer member 61 and the openings 62a and 62b of the rear fixing inner member 62 are fixed to the second coupling member 40 via screws or the like, the openings are equivalent to fixing portions. The openings 61a, 61p, and 62a are formed to correspond to the open cross section region S2b of the second coupling member 40, and the opening 62b corresponds to the closed cross section region S2a of the second coupling member 40.

As illustrated in FIG. 17, the strut tower bar 20 has a thickness corresponding to the two plates (the second coupling outer member 41 and the second coupling inner member 42) in an intermediate portion in the longitudinal direction of the second coupling member 40, has a thickness corresponding to the three plates (the second coupling outer member 41, the second coupling inner member 42, and the rear fixing inner member 62) further outside in the vehicle width direction, and has a thickness corresponding to the four plates (the rear fixing outer member 61, the first coupling outer member 31, the second coupling inner member 42, and the rear fixing inner member 62) further outside in the vehicle width direction. In addition, the strut tower bar 20 has a thickness corresponding to the four plates (the rear fixing outer member 61, the first coupling outer member 31, the adjusting member 27, and the rear fixing inner member 62) further outside in the vehicle width direction, has a thickness corresponding to the three plates (the rear fixing outer member 61, the first coupling outer member 31, and the rear fixing inner member 62) further outside in the vehicle width direction, and has a thickness corresponding to the two plates (the rear fixing outer member 61 and the rear fixing inner member 62) further outside in the vehicle width direction.

Accordingly, the thickness of the strut tower bar 20 only changes within two plates when viewed in the longitudinal direction. In other words, since change in the member rigidity in the longitudinal direction is suppressed in the strut tower bar 20, the occurrence of local displacement due to the vehicle body behavior mode can be suppressed.

Next, the operation and effect of the front body structure of the vehicle V according to the example will be described.

In describing the operation and effect, the deformation behavior of the vehicle V in the membrane vibration mode has been analyzed by computer aided engineering (CAE).

Figure 20A:
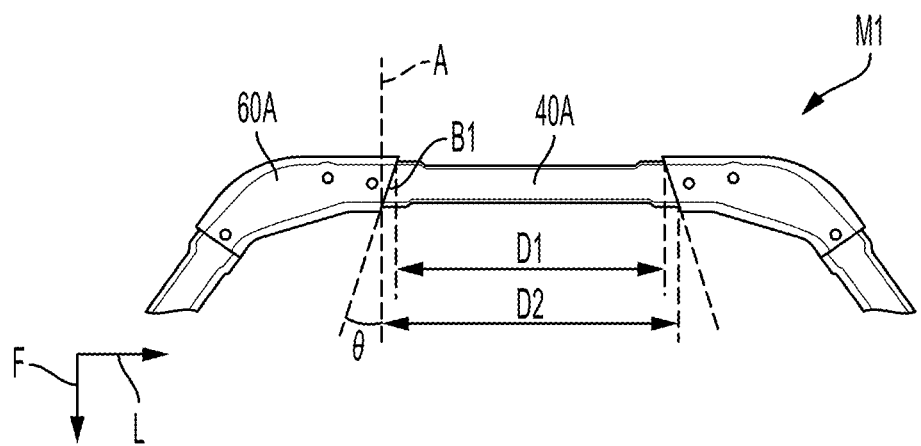
FIG. 20 illustrates plan views of models used for verification.
Figure 20B:
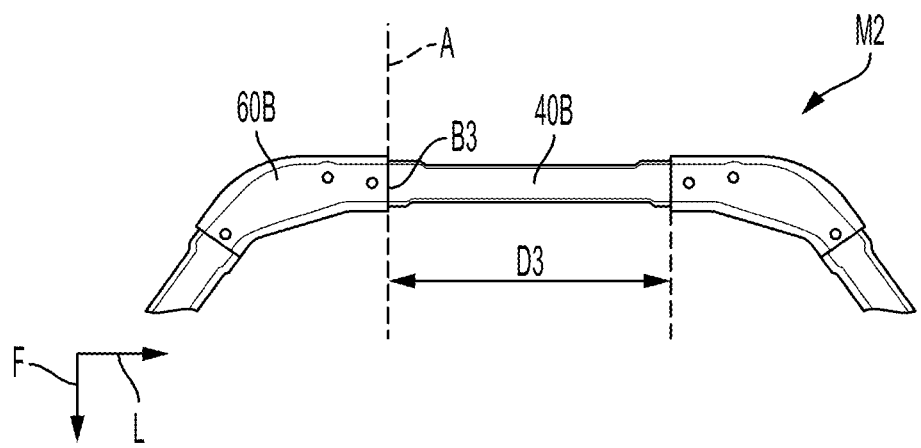

As illustrated in (a) FIG. 20, a strut tower bar model M1 has the same specifications regarding the performance such as the material, the dimensions, the rigidity, and the strength as in the present embodiment.

The boundary portions B1 between a coupling member 40A corresponding to the second coupling member 40 and fixing members 60A corresponding to the rear fixing members 60 intersect the neutral axes A at angle θ, i.e., an oblique angle, and the distance D2 between the boundary portions on the front side is longer than the distance D1 between the boundary portions on the rear side.

As illustrated in (b) of FIG. 20, a strut tower bar model M2 has the same specifications as the model M1 except boundary portions B3 between a coupling member 40B and fixing members 60B.

Since the boundary portions B3 are parallel to the neutral axes A, the distance D3 between the boundary portions on the front side and the distance D3 between the boundary portions on the rear side are equal.

The behavior during a travel on a rough road surface was analyzed with the models M1 and M2 disposed like a cantilever near the front side of the cowl portion 3 in side view and fixed with the stud bolts 9 (mounting brackets 8).

Figure 21A:
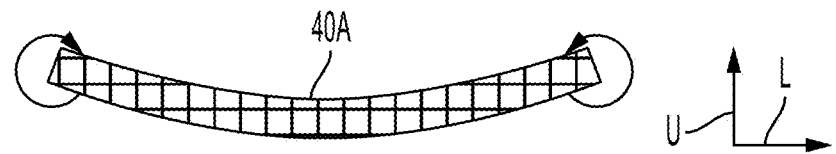
FIG. 21 illustrates a front view and a vertical sectional view of the verification result of model 1.
Figure 21B:
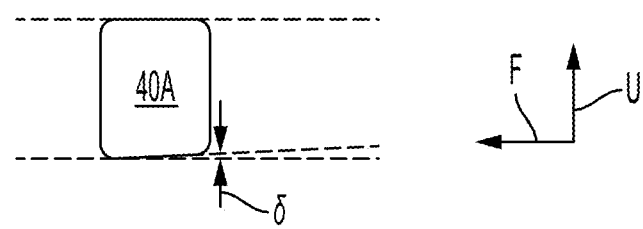
Figure 22A:
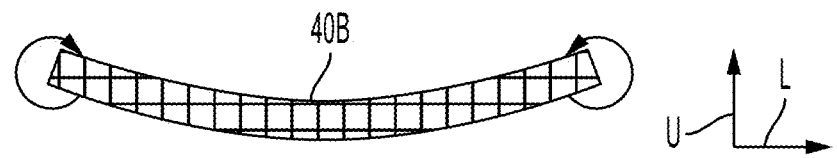
FIG. 22 illustrates a front view and a vertical sectional view of the verification result of model 2.
Figure 22B:
Figure 23A:
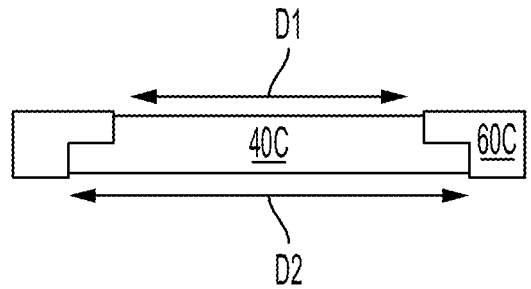
FIG. 23 illustrate modifications of a second coupling member and rear fixing members.
Figure 23B:
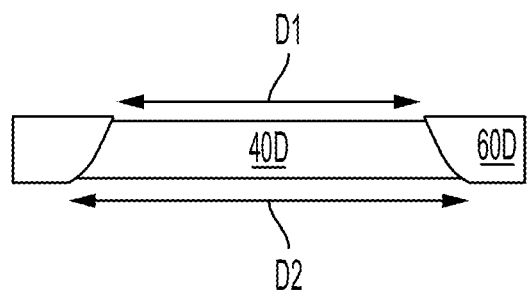
Figure 23C:
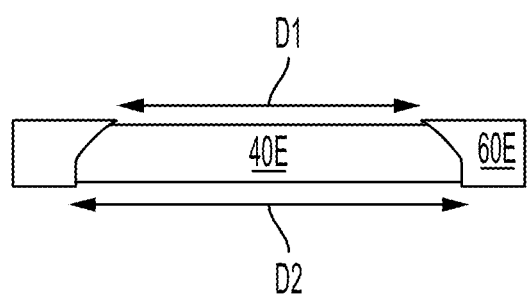
Figure 23D:
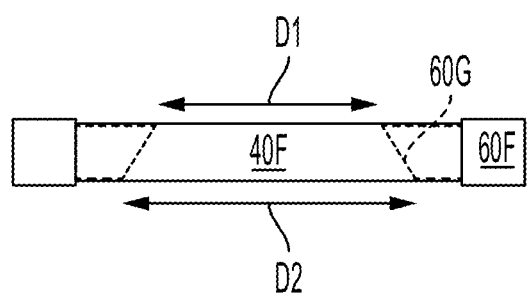

The analysis results are illustrated in FIGS. 21 and 22.

As illustrated in (a) of FIG. 21, the coupling member 40A deforms vertically as the cowl portion 3 in the membrane vibration mode displaces vertically. At this time, since a uniform load is input to the coupling member 40A from the cowl portion 3, bending moments as illustrated by the arrows are generated in both end portions.

As illustrated in (b) FIG. 21, the distance D2 between the boundary portions on the front side is longer than the distance D1 between the boundary portions on the rear side, strain 5 due to the bending moments is generated in the rear end portions of the boundary portions B1 near the cowl portion 3 (vehicle body). In other words, torsional deformation is induced in the coupling member 40A by converting the vertical displacement of the cowl portion 3 to the torsional displacement of the coupling member 40A. It should be noted that, as the oblique angle θ increases, the conversion efficiency increases and the vibration damping performance is improved.

As illustrated in (a) of FIG. 22, the coupling member 40B vertically deforms as the cowl portion 3 in the membrane vibration mode vertically displaces and bending moments as illustrated by the arrows are generated in both end portions.

As illustrated in (b) in FIG. 22, since the distance between the boundary portions on the front side and the distance between the boundary portions on the rear side are equally set to the distance D3 between the boundary portions, no strain difference is generated between the front end portion and the rear end portion of the boundary portion B3.

Accordingly, no torsional deformation occurs in the coupling member 40B.

According to the body structure of this vehicle V, since the boundary portions B1 between the pair of rear fixing members 60 and the second coupling member 40 are formed in both end portions in the longitudinal direction of the second coupling member 40, the second coupling member 40 can be supported by the vehicle body with both sides in the longitudinal direction held. Since the distance D1 between the boundary portions on the rear side is different from the distance D2 between the boundary portions on the front side in the boundary portions B1 that extend along the neutral axes A defined by the lines of intersection between the neutral plane of the bending moments of the second coupling member 40 and the cross sections of the second coupling member 40 when a bending load is input through the pair of rear fixing members 60 to the second coupling member 40, it is possible to make the bending moments acting on the rear end side of the boundary portions B1 different from the bending moments acting on the front end side of the boundary portions B1 even in the bending input portion and cause torsional deformation in the second coupling member 40 by converting the vertical displacement acting on the second coupling member 40 to the torsional displacement.

The rear end portions of the boundary portions B1 are disposed in proximity to the vehicle body and the front end portions of the boundary portions B1 are disposed away from the vehicle body, i.e., the rear end portions are closer to the vehicle body than the front end portions, and the distance D1 between the boundary portions on the rear side is smaller than the distance D2 between the boundary portions on the front side. According to this structure, even when the second coupling member 40 is disposed on the side of the vehicle body, it is possible to make the bending moments acting on the rear end portion of the boundary portions B1 between the rear fixing members 60 and the second coupling member 40 different from the bending moments acting on the front end portion. In addition, since the distance D1 between the boundary portions on the rear side is smaller than the distance D2 between the boundary portions on the front side, the torsional displacement of the second coupling member 40 can be increased.

The boundary portions B1 extending along the neutral axes A may be inclined.

Accordingly, since the bending moments along the boundary portions B1 is gradually changed, the local concentration of a load on the second coupling member 40 can be avoided. In addition, the portions near the boundary portions B1 can contribute to the damping of vibrations.

The rear fixing member 60 includes the rear fixing outer member 61 and the rear fixing inner member 62 that forms the closed cross section C4 that extends in the longitudinal direction in cooperation with the rear fixing outer member 61 and the boundary portions B1 and B2 of the rear fixing outer member 61 and the rear fixing inner member 62 are inclined, so the vertical displacement acting on the second coupling member 40 can be reliably converted to the torsional displacement with a simple structure.

Since the second coupling member 40 includes the second coupling outer member 41 that has a substantially U-shaped cross section and the second coupling inner member 42 that has a substantially U-shaped cross section and forms the closed cross section C2 extending in the longitudinal direction by fitting to the second coupling outer member 41, the closed cross section C2 can promote an increase in the bending rigidity of the second coupling member 40 and the open cross section formed by the difference in the dimensions in the longitudinal direction can promote an increase in the vibration damping performance of the second coupling member 40.

Since the body structure includes the dash panel 1 that extends in the vehicle width direction and separates the vehicle interior R from the engine room E and the cowl portion 3 provided on the dash panel 1 and the second coupling member 40 is coupled to one end side and the other end side in the vehicle width direction of the cowl portion 3, the vibration damping function of the second coupling member 40 can be achieved and the riding comfort of the occupants can be improved by converting the vertical displacement of the cowl portion 3 in the membrane vibration mode to the torsional displacement of the second coupling member 40.

Next, modifications obtained by partially changing the embodiment will be described.

1) Although the boundary portions B1 between the rear fixing outer member 61 and the second coupling outer member 41 and the boundary portions B2 between the rear fixing inner member 62 and second coupling inner member 42 are offset in the vehicle width direction in the example of the embodiment, the boundary portions B1 and the boundary portions B2 may be disposed at the same positions in the vehicle width direction so as to be superposed on each other.

2) Although the second coupling member 40 includes the second coupling outer member 41 and the second coupling inner member 42 and has a rectangular cross section in the example of the embodiment, the second coupling member 40 may be formed by a solid plate made from a single member. Accordingly, the cross section orthogonal to the longitudinal direction may be a circular or polygonal closed cross section or an open cross section. A filling material such as a foam filler may be disposed in the cross section. In addition, the closed cross section or the open cross section may be formed by two members including an outer and an inner or may be formed by three or more members. The shape of the cross section and the constituent members can be arbitrarily set.

3) Although the boundary portions B1, disposed between the rear fixing outer member 61 and the second coupling outer member 41, that extend along the neutral axes A may be inclined in the example of the embodiment, the boundary portions may have any shape.

As illustrated in (a) of FIG. 23, the boundary portions may be stepped. This can make the distance D1 between the boundary portions on the rear side different from the distance D2 between the boundary portions on the front side and the bending moments acting on one end side of the boundary portions between fixing members 60C and a coupling member 40C different from the bending moments acting on the other end side of the boundary portions depending on the shapes of the boundary portions.

As illustrated in (b) FIG. 23, the boundary portions between fixing members 60D and a coupling member 40D may be curved. This can make the distance D1 between the boundary portions on the rear side different from the distance D2 between the boundary portions on the front side and the shapes of the boundary portions smooth.

In addition, as illustrated in (c) of FIG. 23, the boundary portions between fixing members 60E and a coupling member 40E may have two inclined surfaces. This can change the tendency of changes in the bending moments in multiple stages. In particular, as shown in (c) of FIG. 23, a first inclined surface may increase, e.g., continuously increase, from the distance D1 to the distance D2 and a second inclined surface may maintain the distance D2.

As illustrated in (d) of FIG. 23, the boundary portions between fixing members 60F and a coupling member 40F may be formed within the closed cross section of the coupling member 40F. Extension portions 60G of the fixing members 60F close to the coupling member 40F may be inserted into the closed cross section of the coupling member 40F. This can induce the torsional displacement of the coupling member 40F while reducing the number of components of the boundary portions between the fixing members 60F and the coupling member 40F. In other words, the effective distances are still D1 and D2, even though the physical lengths of front and rear sides of the coupling member 40F are the same.

4) Although an example of a strut suspension has been described in the embodiment, at least a cylindrical tower member projecting upward only needs to be provided and the present invention may be applied to a vehicle having a swing arm or multilink suspension.

5) Other than the above, those skilled in the art can practice the present invention as an embodiment in which various changes are made to the embodiment described above or an embodiment in which individual embodiments are combined with each other without departing from the scope of the present invention, and the present invention also includes such changed embodiments.

DESCRIPTION OF REFERENCE SIGNS AND NUMERALS

1: dash panel
3: cowl portion
40: second coupling member
41: second coupling outer member
42: second coupling inner member
60: rear fixing member
61: rear fixing outer member
62: rear fixing inner member
V: vehicle
B1: (outer side) boundary portion
B2: (inner side) boundary portion
C2: (second coupling member) closed cross section
C4: (rear fixing member) closed cross section
D1: distance between boundary portions on rear side
D2: distance between boundary portions on front side

The invention claimed is:

1. A body structure of a vehicle comprising:
a coupling member made of fiber reinforced plastic including fibers impregnated with synthetic resin, the fibers being oriented so that more fibers extend in a longitudinal direction of the coupling member than extend in directions other than the longitudinal direction; and
a pair of fixing members that have a bending rigidity higher than the coupling member, the pair of fixing members fixing both end portions in the longitudinal direction of the coupling member to a vehicle body;
a dash panel that extends in a vehicle width direction and separates a vehicle interior from an engine room; and
a cowl portion provided on the dash panel, wherein
the coupling member is coupled to a first end portion and a second end portion in the vehicle width direction of the cowl portion,
the coupling member extends continuously in the vehicle width direction along the cowl portion between the first end portion and the second end portion,
boundary portions between the pair of fixing members and the coupling member are formed in both end portions in the longitudinal direction of the coupling member, and
a distance between the boundary portions on a first end side is different from a distance between the boundary portions on a second end side in the boundary portions that extend along neutral axes defined by lines of intersection between a neutral plane of bending moments of the coupling member and lateral cross sections of the coupling member when a bending load is input through the pair of fixing members to the coupling member, wherein
the coupling member has an outer member having a substantially U-shaped cross section and an inner member having a substantially U-shaped cross section, the inner member forming a closed cross section extending in the longitudinal direction by fitting to the outer member, and
the inner member and the outer member both have side wall portions that extend in a same direction along the longitudinal direction.

2. The body structure of a vehicle according to claim 1, wherein
first end portions of the boundary portions are disposed in proximity to the vehicle body and second end portions of the boundary portions are disposed away from the vehicle body, and
the distance between the boundary portions on the first end side is smaller than the distance between a boundary portions on the second end side.

3. The body structure of a vehicle according to claim 2, wherein the boundary portions extending along the neutral axes are inclined.

4. The body structure of a vehicle according to claim 3, wherein
each of the pair of fixing members includes a fixing outer member and a fixing inner member that forms a closed cross section extending in the longitudinal direction in cooperation with the fixing outer member, and
a boundary part between the fixing outer member and the fixing inner member is inclined.

5. The body structure of a vehicle according to claim 2, wherein the boundary portions that extend along the neutral axes are stepped.

6. The body structure of a vehicle according to claim 2, wherein portions of the pair of fixing members close to the coupling member are inserted into the closed cross section of the coupling member.

7. The body structure of a vehicle according to claim 6, further comprising:
a dash panel that extends in a vehicle width direction and separates a vehicle interior from an engine room; and
a cowl portion provided on the dash panel,
wherein the coupling member is coupled to a first end portion and a second end portion in the vehicle width direction of the cowl portion.

8. The body structure of a vehicle according to claim 1, wherein the boundary portions extending along the neutral axes are inclined.

9. The body structure of a vehicle according to claim 8, wherein
each of the pair of fixing members includes a fixing outer member and a fixing inner member that forms a closed cross section extending in the longitudinal direction in cooperation with the fixing outer member, and
a boundary part between the fixing outer member and the fixing inner member is inclined.

10. The body structure of a vehicle according to claim 8, further comprising:
a dash panel that extends in a vehicle width direction and separates a vehicle interior from an engine room; and
a cowl portion provided on the dash panel,
wherein the coupling member is coupled to a first end portion and a second end portion in the vehicle width direction of the cowl portion.

11. The body structure of a vehicle according to claim 1, further comprising:
a dash panel that extends in a vehicle width direction and separates a vehicle interior from an engine room; and
a cowl portion provided on the dash panel,
wherein the coupling member is coupled to a first end portion and a second end portion in the vehicle width direction of the cowl portion.

12. The body structure of a vehicle according to claim 1, wherein the closed cross-section is formed from just the outer member and the inner member.

13. The body structure of a vehicle according to claim 1, wherein side wall portions of the outer member extend fully along side wall portions of the inner member.

14. The body structure of a vehicle according to claim 13, wherein inner surface of side wall portions of the outer member contact outer surfaces of the side wall portions of the inner member fully along side wall portions of the inner member.

15. The body structure of a vehicle according to claim 1, wherein the outer member includes an upper wall portion extending between the side wall portions and the inner member includes an upper wall portion extending between the side wall portions, wherein an upper surface of the upper wall portion of the inner member faces a lower surface of the upper wall portion of the outer member in the closed cross section.

16. The body structure of a vehicle according to claim 1, wherein the closed cross section is symmetric with respect to a middle line of a cross section orthogonal to the longitudinal direction.

17. The body structure of a vehicle according to claim 16, wherein the closed cross section has a trapezoidal shape.

18. The body structure of a vehicle according to claim 1, wherein side wall portions of the inner member and outer member extend in parallel to one another.

19. The body structure of a vehicle according to claim 1, further comprising:
a pair of left and right strut towers that bulge toward the inside of the engine room; and
a pair of second coupling members connecting the left strut tower and the left connecting member and connecting the right strut tower and the right connecting member.

20. The body structure of a vehicle according to claim 19, wherein the second coupling member shift to the inside in the vehicle width direction toward the rear side.

* * * * *